(12) United States Patent
Hsu et al.

(10) Patent No.: US 8,483,913 B2
(45) Date of Patent: Jul. 9, 2013

(54) SELF-CALIBRATION METHOD FOR ELECTRIC POWER STEERING SYSTEM

(75) Inventors: Jin-Yan Hsu, Changhua County (TW); Chih-Jung Yeh, Changhua County (TW); Tsung-Hsien Hu, Changhua County (TW); Hsien-Chang Chiu, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 218 days.

(21) Appl. No.: 13/037,580

(22) Filed: Mar. 1, 2011

(65) Prior Publication Data
US 2012/0173081 A1    Jul. 5, 2012

(30) Foreign Application Priority Data
Dec. 31, 2010  (TW) ............................... 99147208 A

(51) Int. Cl.
*A01B 69/00* (2006.01)

(52) U.S. Cl.
USPC .............................................. 701/42; 701/41

(58) Field of Classification Search
USPC ..................................................... 701/41–42
See application file for complete search history.

(56) References Cited

U.S. PATENT DOCUMENTS

| | | | |
|---|---|---|---|
| 6,173,223 B1 * | 1/2001 | Liubakka et al. | 701/42 |
| 7,571,040 B2 * | 8/2009 | Murty et al. | 701/41 |
| 2004/0117087 A1 * | 6/2004 | Dilger | 701/41 |
| 2005/0085971 A1 * | 4/2005 | Yuda et al. | 701/41 |
| 2006/0259221 A1 * | 11/2006 | Murty et al. | 701/41 |
| 2009/0115377 A1 | 5/2009 | Schwenke et al. | |
| 2010/0250069 A1 * | 9/2010 | Murty et al. | 701/42 |
| 2012/0130594 A1 * | 5/2012 | Murty et al. | 701/42 |

FOREIGN PATENT DOCUMENTS

| | | |
|---|---|---|
| CN | 1746064 A | 3/2006 |
| CN | 101513859 A | 8/2009 |

OTHER PUBLICATIONS

Communication From the Taiwan Patent Office Regarding a Counterpart Taiwan Application Dated (101-12-21) Dec. 12, 2012.

* cited by examiner

*Primary Examiner* — Hussein A. Elchanti
(74) *Attorney, Agent, or Firm* — Rosenberg, Klein & Lee

(57) ABSTRACT

The present invention discloses a self-calibration method for an electric power steering system, which can self-calibrate the sensors to a normalized state to prevent from signal distortion, whereby to maintain stable steering sense of the driver and promote robustness and performance of the EPS system. The self-calibration method includes a signal offset compensation tactic and a zero-point signal self-calibration tactic. The present invention determines whether to undertake self-calibration according to judgement tactics, including a sensor power supply judgement tactic, a sensor correctness judgement tactic, and a self-calibration triggering condition. The self-calibration method can increase the correctness of sensors, maintain the original steering-assisting function and promote robustness of the EPS system.

10 Claims, 10 Drawing Sheets

SELF-CALIBRATION METHOD FOR ELECTRIC POWER STEERING SYSTEM

BACKGROUND OF THE INVENTION

1. Field of the Invention

The present invention relates to a self-calibration method for an electric power steering system, particularly to an EPS self-calibration method normalizing signals of sensors.

2. Description of the Related Art

Before, a powerful and smooth-operation HPS (Hydraulic Power Steering) system was used as an auxiliary power source to lessen the driver's burden of operating the steering wheel. However, hydraulic fluid is likely to leak from hydraulic piping. Further, hydraulic fluid is likely to heat up and denature because of friction between hydraulic fluid and piping. Besides, hydraulic piping is usually very complicated. Thus, the EPS (Electric Power Steering) system has gradually replaced the conventional HPS system.

Compared with the HPS system using a hydraulic pump, an oil tank, hydraulic piping and a belt-pulley system that transmits engine power to drive the pump, the EPS system is implemented by electronic signals and thus has lower fabrication cost and maintenance cost. Further, the EPS system provides different amounts of power for different driving conditions. The EPS system does not output power unless the condition needs it. The EPS system makes the driver to steer the vehicle more easily and accelerates the response of the vehicle. Therefore, the EPS system will be a standard apparatus of vehicles soon or later.

The EPS system uses a torque sensor and a current sensor. The steering sense of the driver is greatly influenced by signals of sensors of the EPS system, such as the torque sensor and the current sensor. Therefore, the sensors of EPS systems should be calibrated to a normal state before delivery. Because of long-term use or displacement of installation positions, sensors will drift from their normal states and generates signals having slight errors. The errors are measured and compensated for to restore sensors to have the original setting or better setting. Environmental factors, such as temperature, or instable power supply, may cause erroneous auxiliary torque or discontinuous auxiliary force and affect the performance of the EPS system. In assembling an EPS system to a vehicle, sensor normalization takes time. In mass production, the total time and manpower spent in normalizing the sensors of all the vehicles is very considerable. Therefore, how to overcome sensor accuracy degradation caused by power supply variation and promote robustness of EPS systems is a problem the manufacturers desire to solve.

Accordingly, the present invention proposes a self-calibration method for an electric power steering system to overcome the abovementioned problems.

SUMMARY OF THE INVENTION

The primary objective of the present invention is to provide a self-calibration method for an electric power steering system, which can self-calibrate the sensors to a normalized state to prevent from signal distortion, whereby to maintain stable steering sense of the driver and promote robustness and performance of the EPS system.

Another objective of the present invention is to provide a self-calibration method for an electric power steering system, which uses a signal offset compensation tactic to increase accuracy of sensors, whereby to maintain performance of the EPS system and enhance robustness of the EPS system.

A further objective of the present invention is to provide a self-calibration method for an electric power steering system, which can overcome the problem that the conventional technology spends a great amount of time and labor to calibrate sensors of the EPS system.

To achieve the abovementioned objectives, the present invention proposes a self-calibration method for an electric power steering system, which comprises steps: detecting power supply values of at least one sensor module, and examining whether the power supply value meets a power supply condition: if the power supply value does not meet a power supply condition, interrupting operation of an electric power steering system; if the power supply value meets a power supply condition, examining whether the sensor module operates normally; if the sensor module operates abnormally, the electric power steering system switching auxiliary functions; if the sensor module operates normally, examining whether the sensor module meets a preset self-calibration triggering condition; if the sensor module does not meet a preset self-calibration triggering condition, and the EPS system uses the previous self-calibration value of the sensor module to undertake the function of the sensor module; if the sensor module meets a preset self-calibration triggering condition, setting a new self-calibration value, and the EPS system undertaking a normalization activity.

Below, the embodiments are described in detail to make easily understood the objectives, technical contents, characteristics and accomplishments of the present invention.

DETAILED DESCRIPTION OF THE INVENTION

Figure 1:
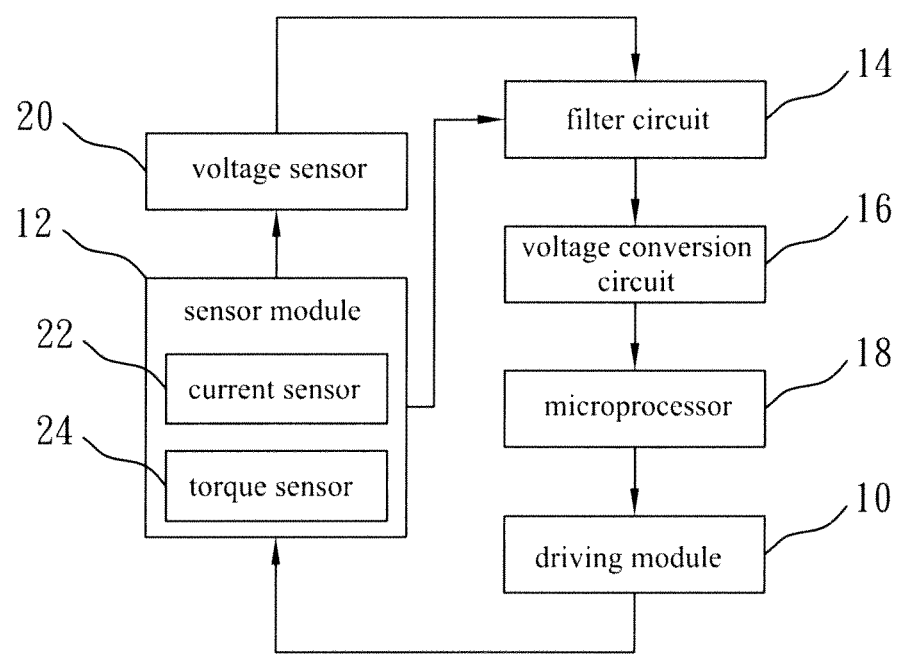
FIG. 1 is a block diagram schematically showing the architecture of an EPS system according to one embodiment of the present invention.
Figure 2:
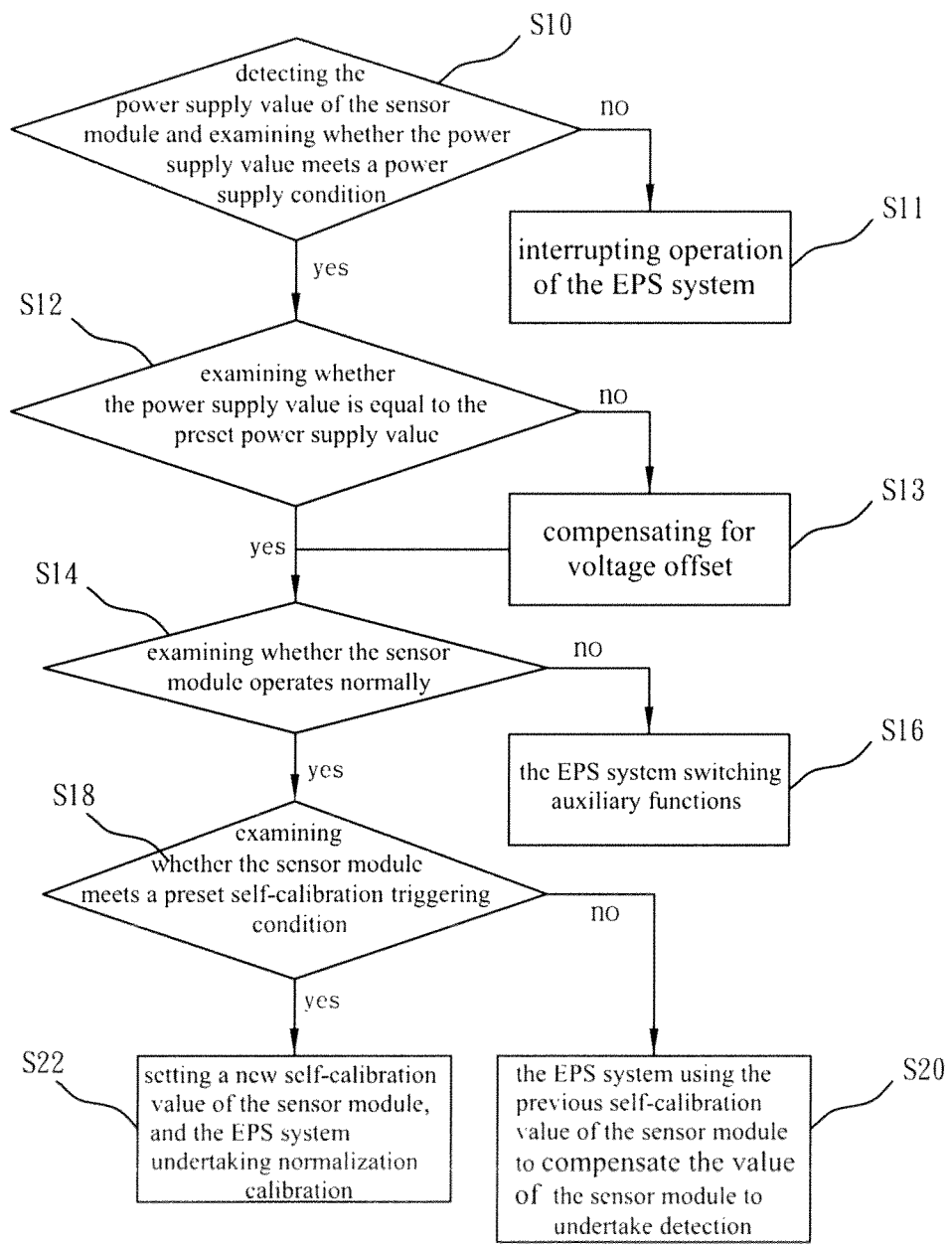
FIG. 2 is a flowchart of a self-calibration method for an EPS system according to one embodiment of the present invention.

In the present invention, the EPS system applies to a vehicle. The variation or abnormality of the power supply of any sensor of the EPS system may cause distortion of sensor signals or false actions of the EPS system. In order to avoid the abovementioned problems, the present invention addresses improving safety and robustness of the EPS system. Refer to FIG. 1 and FIG. 2. FIG. 1 is a block diagram schematically showing the architecture of an EPS system according to one embodiment of the present invention. FIG. 2 is a flow chart of a self-calibration method for an EPS system according to one embodiment of the present invention. The EPS system of the present invention comprises a driving module 10, at least one sensor module 12, a filter circuit 14, a voltage conversion circuit 16 and a microprocessor 18. The driving module 10 is coupled to a vehicle steering system and outputs torque to assist the vehicle driver in rotating the steering wheel. The driving module 10 includes a motor driver, a motor and a decelerator. The motor driver is coupled to the motor. The decelerator connects the motor with the steering mechanism of the vehicle. The motor driver operates to assist the vehicle driver in rotating the steering wheel according to the control signals of the microprocessor 18. A current sensor 22 of the sensor module 12 is connected with the driving module 10 and used to detect the operation status of the driving module 10. A torque sensor 24 of the sensor module 12 is connected with the steering mechanism and used to detect the torque by which the vehicle driver rotates the steering wheel. The filter circuit 14 is connected with the sensor module 12 and used to filter out noise in the power supply signals for the sensor module 12. The filter circuit 14 may be a low-pass filter circuit. The voltage conversion circuit 16 is connected with the filter circuit 14 and the microprocessor 18. Firstly, in Step S10, use a voltage sensor 20 to detect the power supply signal of the sensor module 12. The voltage sensor 20 is connected with the sensor module 12 and the filter circuit 14. The voltage conversion circuit 16 (such as an analog-to-digital converter, ADC) converts the power supply signal into a power supply value. The microprocessor 18 examines whether the power supply value meets a power supply condition in order to learn whether the power supply of the sensor module 12 is normal before self-calibration. If the power supply value does not meet a power supply condition, the process proceeds to Step S11 to interrupt the operation of the EPS system. If the power supply value meets a power supply condition, the process proceeds to Step S12, and the microprocessor 18 examines whether the power supply value is equal to the preset power supply value. The case that the power supply value is equal to the preset power supply value is the optimized condition. If the power supply value is not equal to the preset power supply value, the process proceeds to Step S13 to compensate for the voltage offset of the sensor module 12. If the power supply value is equal to the preset power supply value, or after Step S13 has been executed, the process proceeds to Step S14, and the microprocessor 18 examines whether the sensor module 12 operates normally, i.e. examines whether the sensor module 12 operates within a normal range. If the sensor module 12 operates abnormally, the process proceeds to Step S16, and the EPS system switches auxiliary functions, which will be described in detail thereinafter. If the sensor module 12 operates normally, the process proceeds to Step 18, and the microprocessor 18 examines whether the sensor module 18, the wheel speed, the vehicle speed, and the steering angle meet a preset self-calibration triggering condition. If the case does not meet the preset self-calibration triggering condition, the process proceeds to Step S20, and the microprocessor 18 adopts the previous self-calibration value of the sensor module 12 to compensate the value of the sensor module 12 to undertake detection. If the case meets the preset self-calibration triggering condition, the process proceeds to Step S22, and the microprocessor 18 undertake a normalization activity to update the calibration value of the sensor module 12.

The sensor modules further comprises at least one current sensor 22 or at least one torque sensor 24. In Step S10, the sensor module 12, no matter whether it is the current sensor 22 or the torque sensor 24, persistently uses the voltage sensor 20 to measure the power supply of the sensor module 12 and generate a plurality of power supply signals. The voltage conversion circuit 16 converts the plurality of power supply signals into a plurality of power supply values and records the power supply values in a memory. The power supply values are not only used to examine whether the power supply of the sensor module 12 is normal but also used to compensate for voltage offset in the succeeding steps. The present invention has different self-calibration methods to respectively calibrate and normalize the current sensor 22 and the torque sensor 24. After Step S12, the current sensor 22 and the torque sensor 24 respectively have different voltage offset compensation tactics, different tactics to determine whether the sensor module operates normally, different tactics to determine whether a case meets the self-calibration triggering condition, and different ways to switch auxiliary functions. Below are described in detail the self-calibration methods for calibrating and normalizing the current sensor 22 and the torque sensor 24.

Figure 3:
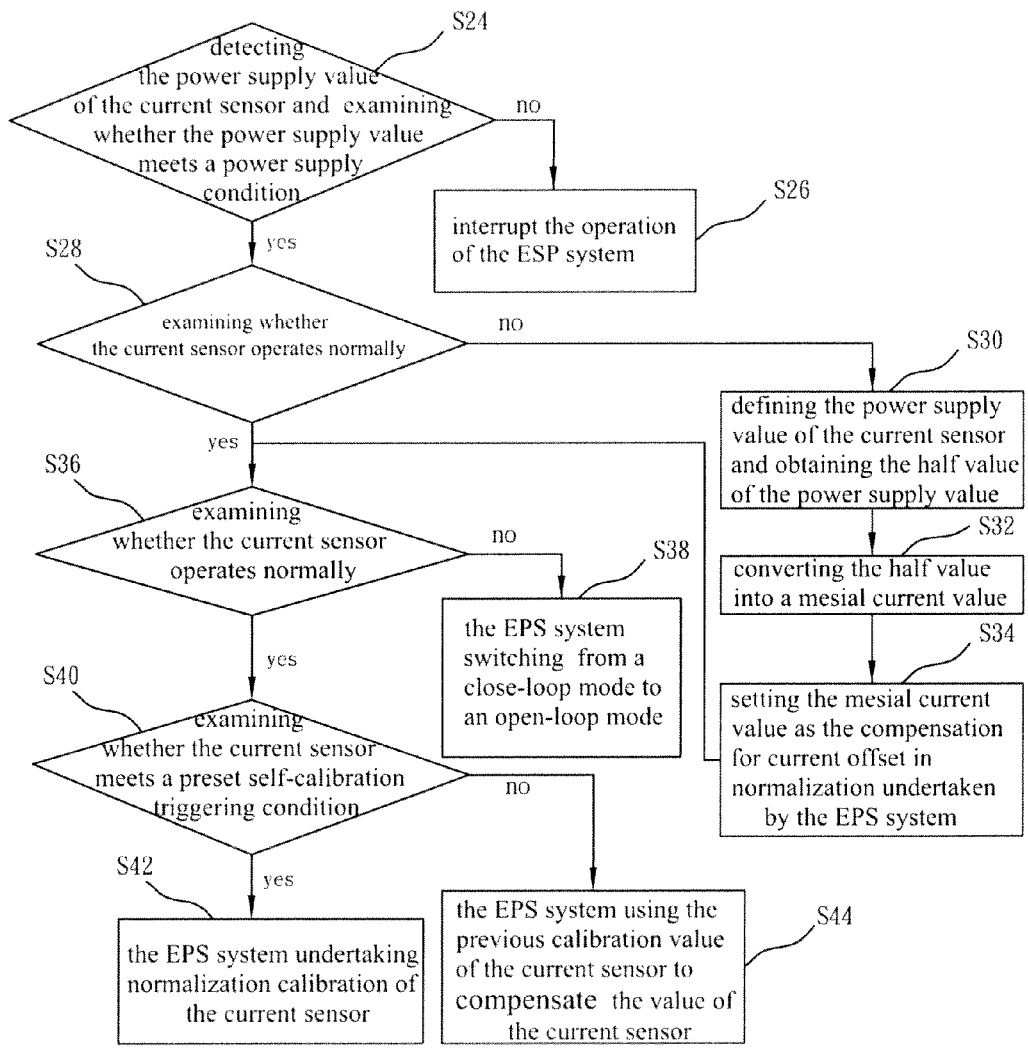
FIG. 3 is a flowchart of a self-calibration method for a current sensor according to one embodiment of the present invention.

Refer to FIG. 3 a flowchart of a self-calibration method for a current sensor according to one embodiment of the present invention. Suppose that the sensor module 12 includes at least one current sensor 22. In Step S24, the voltage sensor 20 detects power supply signals of the current sensor 22; the voltage conversion circuit 16 converts the power supply signals into power supply values; and the microprocessor 18 examines whether the power supply values meet a power supply condition. For example, the microprocessor 18 examines whether the power supply values are within 4.5-5.5V. The power supply is not regarded as at a normal state unless the power supply values are within 4.5-5.5V. If the power supply is not at a normal state, the process proceeds to Step S26 to interrupt the operation of the ESP system. The power supply for the current sensor 22 varies in different conditions. Thus, a voltage offset compensation tactic is executed to make the current sensor 22 have the best performance corresponding to the current power supply value. If the power supply is at a normal state, the process proceeds to Step S28, the microprocessor 18 examines whether the power supply value of the current sensor 22 meets a preset power supply value, such as 5V. The case that the power supply value is equal to the preset power supply value is the optimized condition. If the power supply value is not at 5V, the process proceeds to Step S30. The voltage sensor 20 persistently detects the power supply of the current sensor 22 and generates a plurality of power supply signals. The voltage conversion circuit 16 converts the power supply signals into a plurality of power supply values and records them in a memory. Thus are defined the power supply values of the current sensor 22. Then, take the half values of the power supply values. Next, the process proceeds to Step S32 to convert the half values into mesial current values. Next, the process proceeds to step S34 to set the mesial current values as the compensation for current offset in normalization undertaken by the EPS system. Thereby is finished the normalization activity to compensate for the current offset of the current sensor 22 in from Step S30 to Step S34. If the power supply value is at 5V, or when Step S34 is completed, the process proceeds to Step 36 to examine whether the current sensor 22 operates normally according to a normal operation range. In one embodiment, two current sensors 22 are used to detect the U-phase current and V-phase current of the motor. The microprocessor 18 examines whether the two current sensors 22 simultaneously meet the following two normal operation ranges:

$$V_{phaseU}: 0.5V\text{-}4.5V$$

$$V_{phaseV}: 0.5V\text{-}4.5V$$

Figure 4:
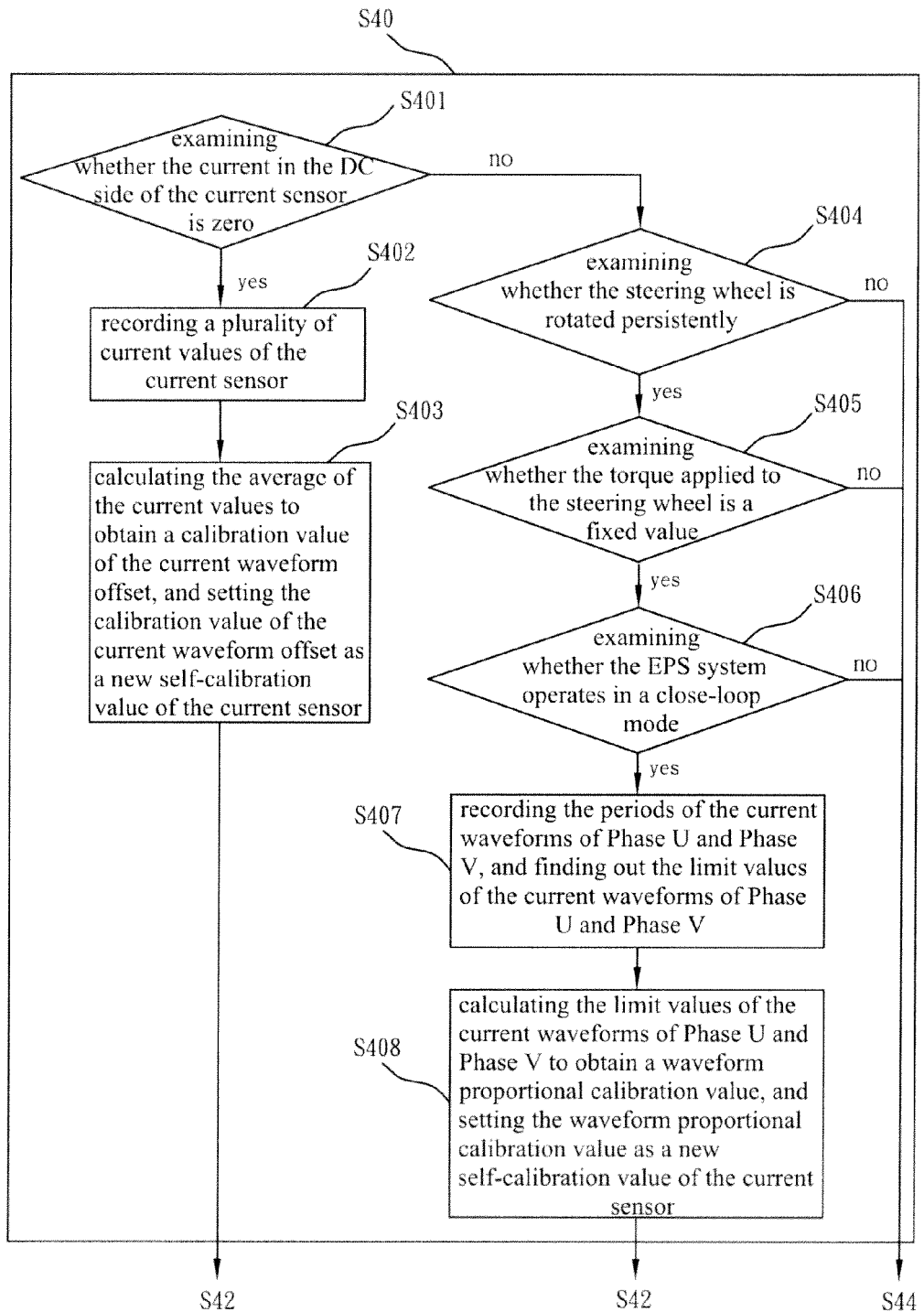
FIG. 4 is a flowchart of the process to determine whether a current sensor meets a preset self-calibration condition according to one embodiment of the present invention.
Figure 5:
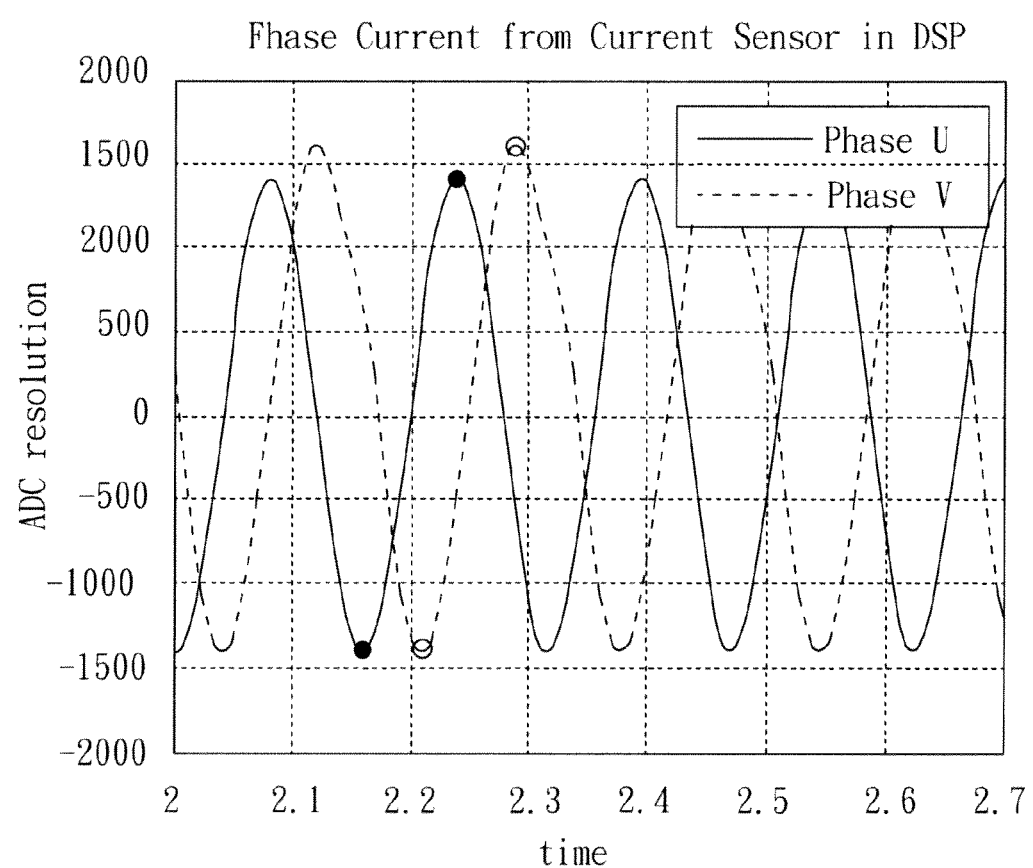
FIG. 5 shows proportional calibration of current waveforms before according to one embodiment of the present invention.
Figure 6:
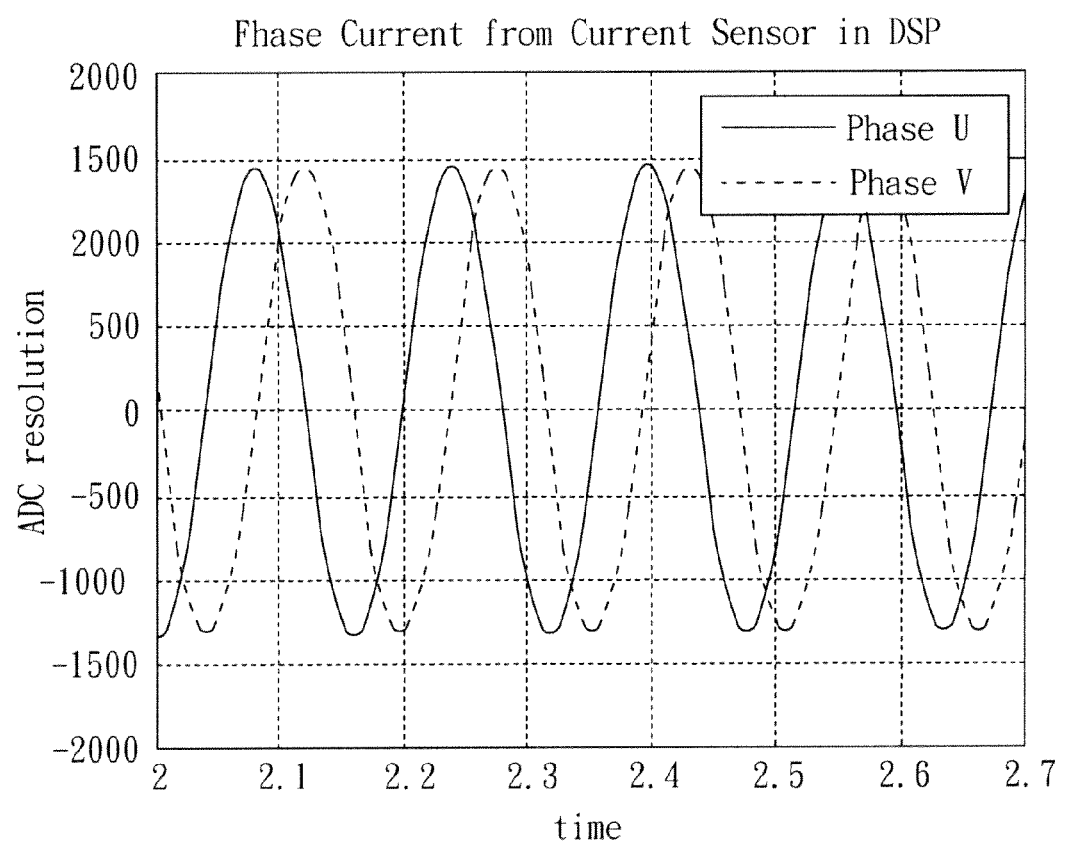
FIG. 6 shows proportional calibration of current waveforms after according to one embodiment of the present invention.

If the current sensor 22 operates abnormally, the process proceeds to Step S38, and the microprocessor 18 undertakes an EPS auxiliary function to switch the EPS system from a close-loop mode to an open-loop mode. Although the EPS system can keep on operating via the switching of the auxiliary functions in the case that the current sensor 22 operates abnormally, the performance of the EPS system is degraded more or less. If the current sensor 22 operates normally, the process proceeds to Step S40. As the operation current may vary with the usage condition, a judgement tactic is needed to determine whether the current sensor 22 meets a self-calibration triggering condition. Refer to FIG. 4 a flowchart of the process to determine whether the current sensor 22 meets the condition of triggering self-calibration. In Step S401, examine whether the current in the DC side of the current sensor 22 is zero. In a DC-side current sensor, a resistor of a known specification is arranged in the side of the driving module 10; the voltage sensor 20 detects the voltage drop across the resistor; the current output by the battery to the driving module 10 is thus worked out according to the Ohm's law. When the driving module 10 does not operate, the DC side current approaches zero. If the DC side current is zero, the process proceeds to Step S402 to record a plurality of current values of the current sensor 22. For example, record a plurality of current values measured in a period of tome. Next, the process proceeds to Step S403 to calculate the average of the current values and obtain a calibration value of the current waveform offset, and the calibration value of the current waveform offset is used as a new self-calibration value of the current sensor 22. Thereby can be determined whether the current sensor 22 meets a self-calibration triggering condition. Next, the process proceeds to Step S42, and the microprocessor 18 of the EPS system undertakes normalization calibration. If the DC side current is non-zero, the process proceeds to Step S404 to determine whether the steering wheel is rotated persistently. If the steering wheel is not rotated persistently, the process proceeds to Step S44, and the microprocessor 18 uses the previous calibration value to compensate the value of the current sensor 22. If the steering wheel is rotated persistently, the process proceeds to Step S405 to examine whether the torque applied to the steering wheel is a fixed value. If the torque applied to the steering wheel is not a fixed value, the process proceeds to Step S44. If the torque applied to the steering wheel is a fixed value, the process proceeds to Step S406 to examine whether the EPS system operates in a close-loop mode. If the EPS system does not operate in a close-loop mode, the process proceeds to Step S44. Refer to FIG. 5 for the proportional calibration of the current waveform before according to one embodiment of the present invention. The current sensor 22 has its own measurement errors. Further, the input current may have an offset. Thus, waveform inconsistency may occur in Phase U and Phase V and thus affect the performance of the EPS system. If the EPS system operates in a close-loop mode, the process proceeds to Step S407 to record the periods of the current waveforms of Phase U and Phase V and find out the limit values of the current waveforms of Phase U and Phase V, wherein "●" in FIG. 6 denotes the limit values (the peaks and troughs) of the current waveform of Phase U, and "○" in FIG. 6 denotes the limit values (the peaks and troughs) of the current waveform of Phase V. Next, the process proceeds to Step S408 to calculate the limit values of the current waveforms of Phase U and Phase V and obtain a waveform proportional calibration value. The waveform proportional calibration value is used as a new self-calibration value of the current sensor 22. Refer to FIG. 6 for the proportional calibration of the current waveform after according to one embodiment of the present invention. Next, the process proceeds to Step S42, and the microprocessor performs normalization calibration and modifies the current waveforms of Phase U and Phase V to have an identical proportion.

Figure 7:
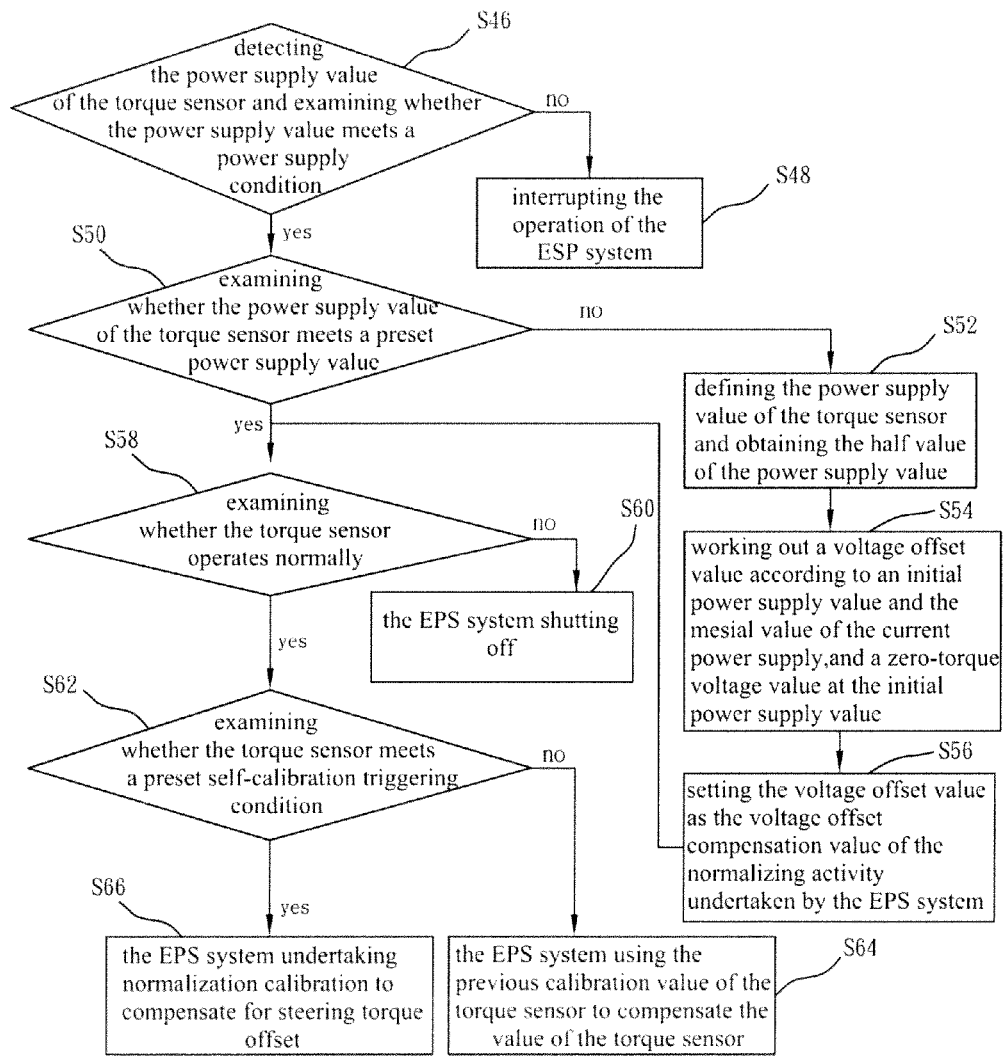
FIG. 7 is a flowchart of a self-calibration method for a torque sensor according to one embodiment of the present invention.
Figure 8:
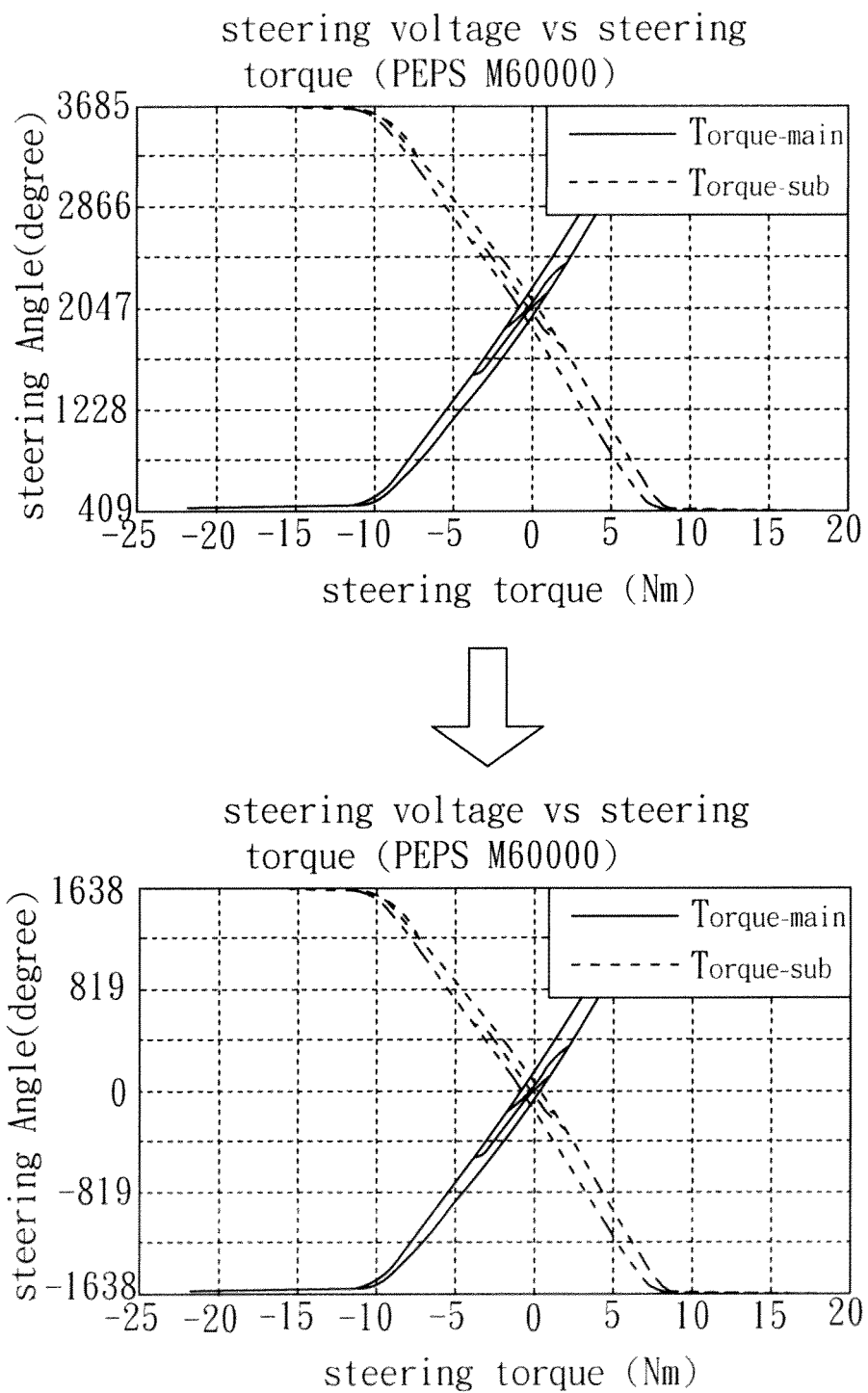
FIG. 8 shows self-calibration of the torque sensor according to one embodiment of the present invention.

Refer to FIG. 7 a flowchart of a self-calibration method for a torque sensor according to one embodiment of the present invention. Suppose that the sensor module 12 includes at least one torque sensor 24. Refer to FIG. 8 for self-calibration of the torque sensor according to one embodiment of the present invention, wherein the case of non-zero voltage corresponding to zero torque is calibrated to be the case of zero baseline corresponding to zero torque. In Step S46, the voltage sensor 20 detects power supply signals of the torque sensor 24; the voltage conversion circuit 16 converts the power supply signals into power supply values; and the microprocessor 18 examines whether the power supply values meet a power supply condition. For example, the microprocessor 18 examines whether the power supply values are within 4.5-5.5V. The power supply is not regarded as at a normal state unless the power supply values are within 4.5-5.5V. If the power supply is not at a normal state, the process proceeds to Step S48 to interrupt the operation of the ESP system. The power supply for the torque sensor 24 may vary with the related electrical elements and degrade by long-term use, which results in slight signal errors. Thus, a voltage offset compensation tactic is executed to make the torque sensor 24 have the best performance corresponding to the current power supply value. If the power supply is at a normal state, the process proceeds to Step S50, and the microprocessor 18 examines whether the power supply value of the torque sensor 24 meets a preset power supply value, such as 5V. The case that the power supply value is equal to the preset power supply value is the optimized condition. If the power supply value is not at 5V, the process proceeds to Step S52. The voltage sensor 20 persistently detects the power supply of the torque sensor 24 and generates a plurality of power supply signals. The voltage conversion circuit 16 converts the power supply signals into a plurality of power supply values and records them in a memory. Thus are defined the power supply values of the torque sensor 24. Then, take the half values of the power supply values. Next, the process proceeds to Step S54 to work out a voltage offset value according to an initial power supply value, the mesial value of the current power supply, and a zero-torque voltage value at the initial power supply value, wherein the microprocessor 18 uses a voltage offset compensation algorithm to work out a new zero-torque voltage value. The voltage offset compensation equation is expressed by $$\text{new zero-torque voltage value} = \frac{1}{2}V_{new\_sensor\_power}\left\{1 + \frac{V_{initial\_zero\text{-}torque} - \frac{1}{2}V_{initial\_sensor\_power}}{\frac{1}{2}V_{initial\_sensor\_power}}\right\}$$

wherein $V_{new\_sensor\_power}$ denotes the current power supply value of the torque sensor 24, $V_{initial\_zero\text{-}torque}$ the voltage value corresponding to zero torque value at the initial power supply value, $V_{initial\_sensor\_power}$ the initial power supply value of the torque sensor 24, and $V_{initial\_zero\text{-}torque}$ the preset value. Next, the process proceeds to Step S56, and the new zero-torque voltage value is set to be the voltage offset compensation value for normalizing the EPS system. Thus is completed the normalization calibration for the voltage offset compensation of the torque sensor 24 in from Step S52 to Step S56.

Figure 9:
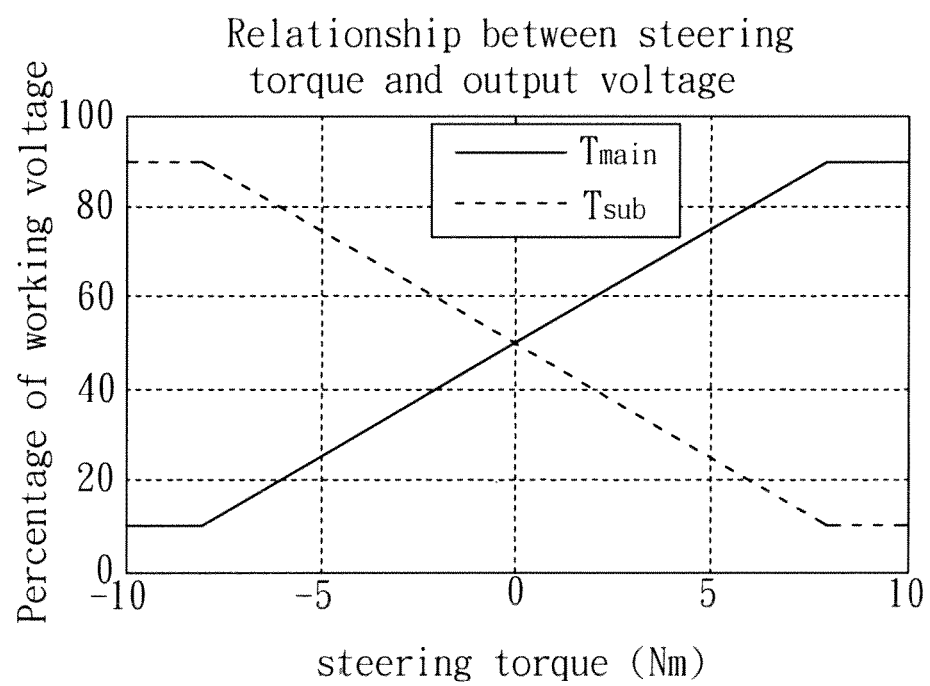
FIG. 9 shows normal operation of a torque sensor according to one embodiment of the present invention.

If the power supply value is at 5V, or when Step S56 is completed, the process proceeds to Step 58 to examine whether the torque sensor 24 operates normally according to a normal operation range. Refer to FIG. 9 for normal operation of the torque sensor according to one embodiment of the present invention. In one embodiment, the torque sensor 24 has two symmetric torque measurement modules detecting the steering torque of the steering wheel. The microprocessor 18 examines whether the torque sensor 24 simultaneously meets the three following normal operation ranges:

$$T_{main}: 0.1\text{-}0.9 V_{sensor\,power}$$

$$T_{sub}: 0.1\text{-}0.9 V_{sensor\,power}$$

$$T_{main} + T_{sub} = V_{sensor\,power}$$

wherein $T_{main}$ denotes one torque sensor 24, $T_{sub}$ another torque sensor 24', and $0.1\text{-}0.9 V_{sensor\,power}$ represents the 10-90% input voltage of the power supply.

Figure 10:
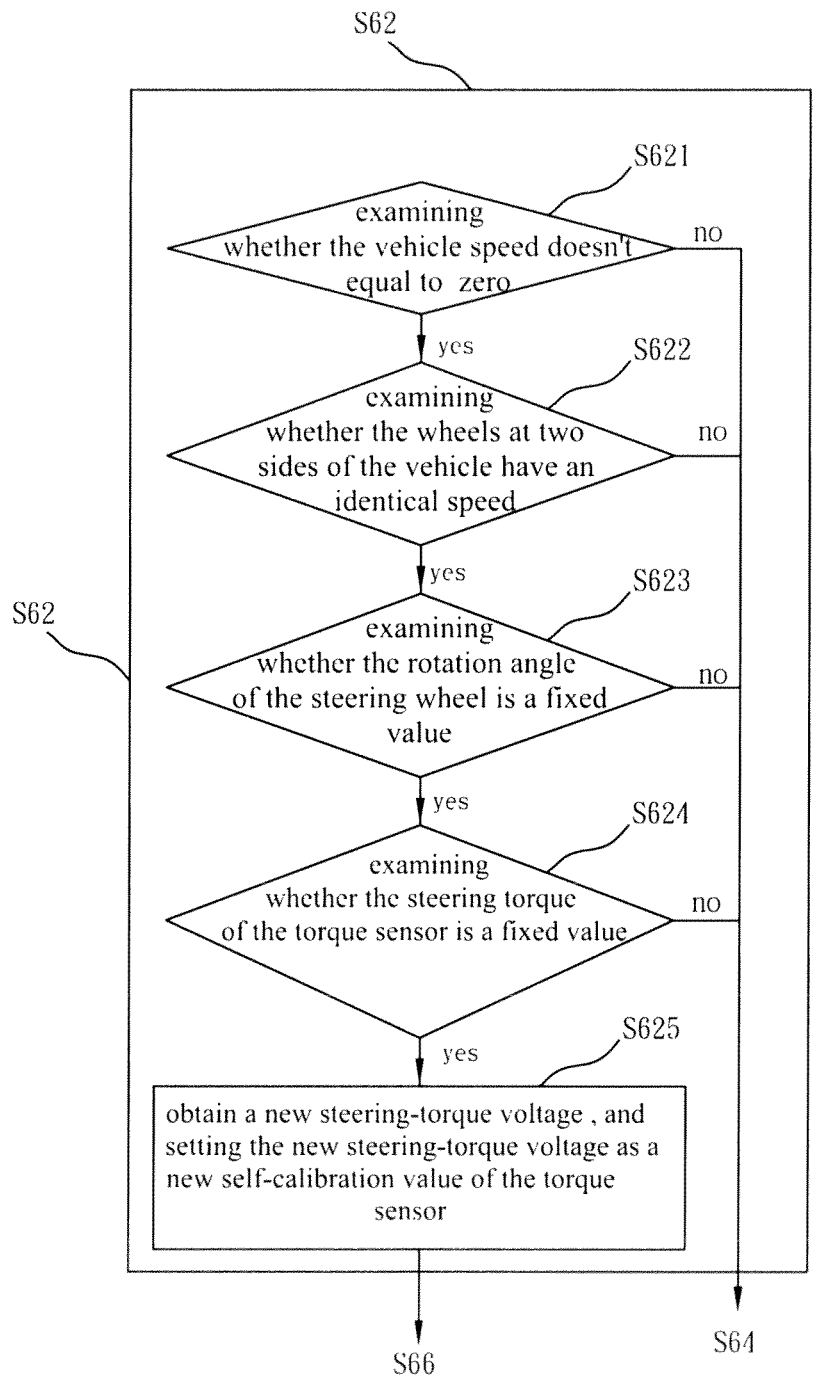
FIG. 10 is a flowchart of a process to determine whether a torque sensor meets a preset self-calibration triggering condition according to one embodiment of the present invention.

If the torque sensor 24 operates abnormally, the process proceeds to Step S60, and the microprocessor 18 directly shuts off the EPS system, and power is no more supplied. If the torque sensor 24 operates normally, the process proceeds to Step S62. As the power supply may vary with the usage condition, a judgement tactic is needed to determine whether the torque sensor 24 meets a self-calibration triggering condition. Refer to FIG. 10 a flowchart of the process to determine whether the torque sensor 24 meets the condition of triggering self-calibration. In Step S621, the microprocessor 18 examines whether the vehicle speed doesn't equal to zero. If the vehicle speed is zero, the process proceeds to Step S64, and the microprocessor 18 uses the previous calibration value to control the operation of the torque sensor 24. If the vehicle speed is not zero, the process proceeds to Step S622 to examine whether the wheels at two sides of the vehicle have an identical speed. If the wheels at two sides of the vehicle respectively have different speeds, the process proceeds to Step S64. If the wheels at two sides of the vehicle have an identical speed, the process proceeds to Step S623 to examine whether the rotation angle of the steering wheel is a fixed value. If the rotation angle of the steering wheel is not a fixed value, the process proceeds to Step S64. If the rotation angle of the steering wheel is a fixed value, the process proceeds to Step S624 to examine whether the steering torque of the torque sensor 24 is a fixed value. If the steering torque is not a fixed value, the process proceeds to Step S64. If the steering torque is a fixed value, the process proceeds to Step S625 to obtain a new steering-torque voltage and use the new steering-torque voltage as a new self-calibration value of the torque sensor 24. Next, the process proceeds to Step S66, and the microprocessor 18 undertakes normalization calibration to compensate for steering torque offset.

In conclusion, the present invention can self-calibrate the distorted signals of a current sensor or a torque sensor to a normalized state and thus promote the robustness and performance of an EPS system. The present invention further uses a signal offset compensation tactic to overcome signal distortion caused by variation or abnormality of power supply. Thereby is promoted the accuracy of the sensors and enhanced the performance and robustness of the EPS system. Therefore, the present invention can save the driver a lot of time and money originally spent in sending his vehicle to a maintenance factory for calibrating the sensors and normalizing the signals thereof.

The embodiments described above are only to exemplify the present invention but not to limit the scope of the present invention. Any equivalent modification or variation according to the spirit or characteristic of the present invention is to be also included within the scope of the present invention.

What is claimed is:

1. A self-calibration method for an electric power steering system, comprising
    establishing a computer processor for performing the following steps:
    Step (A): detecting a power supply value of a sensor module and examining whether said power supply meets a power supply condition; if said power supply does not meet said power supply condition, interrupting operation of an electric power steering system; if said power supply meet said power supply condition, executing Step (B);
    Step (B): examining whether said power supply value is a preset power supply value; if said power supply value is not a preset power supply value, undertaking voltage offset compensation; if said power supply value is a preset power supply value, executing Step (C);
    Step (C): examining whether said sensor module operates normally; if said sensor module cannot operate normally, said electric power steering system switching auxiliary functions thereof; if said sensor module operates normally, executing Step (D); and
    Step (D): examining whether said sensor module meets a preset self-calibration triggering condition; if said sensor module does not meet said preset self-calibration triggering condition, using a previous calibration value of said sensor module, and said electric power steering system compensates the value of the said sensor module to undertake detection; if said sensor module meets said preset self-calibration triggering condition, said electric power steering system undertaking a normalization calibration.

2. The self-calibration method for an electric power steering system according to claim 1, wherein said sensor module includes at least one current sensor or at least one torque sensor.

3. The self-calibration method for an electric power steering system according to claim 2, wherein said current sensor or said torque sensor measures a power supply signal with a voltage sensor and converts said power supply signal into said power supply value with a voltage conversion circuit.

4. The self-calibration method for an electric power steering system according to claim 2, wherein said sensor includes at least one current sensor, and wherein "examining whether said power supply value is a preset power supply value" in said Step (B) further comprises
    Step (B1): defining said power supply value of said current sensor, and obtaining a mesial value of said power supply value;
    Step (B2): converting said mesial value into a medium current value; and
    Step (B3): setting said medium current value as a current offset compensation in a normalization activity to be undertaken by said electric power steering system.

5. The self-calibration method for an electric power steering system according to claim 2, wherein whether said sensor module operates normally is determined according to whether said sensor module operates in a normal operation range; if said sensor module operates in a normal operation range, examining whether said sensor module meets said preset self-calibration triggering condition; if said sensor module does not operate in a normal operation range, said electric power steering system switches operation of said current sensor from a close-loop to an open-loop mode.

6. The self-calibration method for an electric power steering system according to claim 5, wherein "examining whether said sensor module meets said preset self-calibration triggering condition" further comprises Step (D1): examining whether a DC (direct current)-side current of said current sensor is zero; if said DC-side current of said current sensor is zero, executing said Step (D2); if said DC-side current of said current sensor is non-zero, executing said Step (D4);

Step (D2): recording a plurality of current values of said current sensor;

Step (D3): calculating an average of said current values to obtain a current waveform offset calibration value, setting said current waveform offset calibration value as a new self-calibration value of said current sensor, and said electric power steering system undertaking a normalization calibration to compensate for current offset;

Step (D4): examining whether a steering wheel rotates persistently; if said steering wheel does not rotate persistently, said electric power steering system using a previous self-calibration value of said current sensor to control operation of said current sensor; if steering wheel rotates persistently, executing Step (D5);

Step (D5): examining whether a torque value of said steering wheel is a fixed value; if said torque value of said steering wheel is not a fixed value, executing Step (D6);

Step (D6): examining whether said electric power steering system operates in a close-circuit mode; if said electric power steering system does not operate in a close-circuit mode, said electric power steering system using a previous self-calibration value of said current sensor to control operation of said current sensor; if said electric power steering system operates in a close-circuit mode, executing Step (D7);

Step (D7): recording periods of current waveforms in Phase U and Phase V, and finding out limit values of said current waveforms in Phase U and Phase V; and Step (D8): calculating said limit values of said current waveforms in Phase U and Phase V to obtain a waveform proportional calibration value, setting said waveform proportional calibration value as a new self-calibration value of said current sensor, and said electric steering power system undertaking a normalization calibration to regulate said current waveforms in Phase U and Phase V to have an identical proportion.

7. The self-calibration method for an electric power steering system according to claim 2, wherein said sensor module includes at least one torque sensor, and wherein "examining whether said power supply value is a preset power supply value" in Step (B) further comprises Step (b1): defining said power supply value of said torque sensor, and obtaining a mesial value of said power supply value;

Step (b2): working out a voltage offset value according to an initial power supply value, said mesial value of current power supply, a zero-torque voltage value at said initial power supply value; and Step (b3): setting said voltage offset value as a voltage offset compensation value used by said electric power steering system in a normalization activity.

8. The self-calibration method for an electric power steering system according to claim 7, wherein a voltage offset compensation algorithm is used within said computer processor to work out said voltage offset value, and wherein said voltage offset compensation algorithm is realized by a voltage offset compensation equation:

$$\frac{1}{2}V_{new\_sensor\_power}\left\{1+\frac{V_{initial\_zeor-torque}-\frac{1}{2}V_{initial\_sensor\_power}}{\frac{1}{2}V_{initial\_sensor\_power}}\right\}$$

Wherein $V_{new\_sensor\_power}$ denotes a current power supply value of said torque sensor, $V_{initial\_zero-torque}$ denotes a zero-torque voltage value at an initial power supply value, and $V_{initial\_sensor\_power}$ denotes an initial power supply value of said torque sensor.

9. The self-calibration method for an electric power steering system according to claim 2, wherein whether said torque sensor operates normally is determined according to whether said torque sensor operates in a normal operation range; if said torque sensor operates in a normal operation range, examining whether said torque sensor meets said preset self-calibration triggering condition; if said torque sensor does not operate in a normal operation range, said electric power steering system will be shut off.

10. The self-calibration method for an electric power steering system according to claim 9, wherein "examining whether said torque sensor meets said preset self-calibration triggering condition" further comprises Step (d1): examining whether vehicle speed is non-zero; if said vehicle speed is non-zero, executing Step (d2); if said vehicle speed is zero, said electric power steering system uses said previous self-calibration value of said torque sensor to control operation of said torque sensor;

Step (d2): examining whether wheels at two sides have an identical speed; if said wheels at two sides have an identical speed, executing Step (d3); if said wheels at two sides respectively have different speeds, said electric power steering system uses said previous self-calibration value of said torque sensor to control operation of said torque sensor;

Step (d3): examining whether a rotation angle of a steering wheel is a fixed value; if said rotation angle of said steering wheel is a fixed value, executing Step (d4); if said rotation angle of said steering wheel is not a fixed value, said electric power steering system uses said previous self-calibration value of said torque sensor to compensate the value of said torque sensor;

Step (d4): examining whether a steering torque of said torque sensor is a fixed value; if said steering torque of said torque sensor is a fixed value, executing Step (d5); if said steering torque of said torque sensor is not a fixed value, said electric power steering system uses said previous self-calibration value of said torque sensor to compensate the value of said torque sensor; and Step (d5): setting a current steering-torque voltage as a new self-calibration value of said torque sensor, and said electric power steering system using said new self-calibration value of said torque sensor to undertake a normalization calibration and compensate for steering torque offset.

* * * * *